United States Patent [19]

Jensen

[11] Patent Number: 4,968,069

[45] Date of Patent: Nov. 6, 1990

[54] SAND DISPENSING DEVICE HAVING PLURAL COMPARTMENTS

[76] Inventor: Michael S. Jensen, 2801 NE. 86th Ave., Ankeny, Iowa 50021

[21] Appl. No.: 330,132

[22] Filed: Mar. 29, 1989

[51] Int. Cl.$^5$ .............................................. B60B 39/00
[52] U.S. Cl. ............................................ 291/3; 291/38
[58] Field of Search ...................... 291/16, 23, 24, 38, 291/41, 44, 3; 222/631, 636, 637; 400/2, 39

[56] References Cited

U.S. PATENT DOCUMENTS

| 2,352,252 | 6/1944 | Canetta | 291/41 X |
|---|---|---|---|
| 2,587,072 | 2/1952 | Sunheim | 291/16 X |
| 2,606,781 | 8/1952 | Loftus . | |
| 2,904,363 | 9/1959 | Michaletz . | |
| 2,984,508 | 5/1961 | Faue | 291/41 |
| 2,999,711 | 9/1961 | Sturiner | 291/3 |
| 3,345,097 | 10/1967 | Smith | 291/3 |
| 3,363,923 | 1/1968 | Parrish et al. | 291/38 X |
| 3,797,867 | 3/1974 | Hartl | 291/38 X |
| 3,888,524 | 6/1975 | Lee | 291/15 |

FOREIGN PATENT DOCUMENTS 0484608  7/1952  Canada ................................. 291/24

Primary Examiner—Robert J. Oberleitner
Attorney, Agent, or Firm—Jerry T. Kearns

[57] ABSTRACT

A sand dispensing device designed to be carried in the trunk of a vehicle includes a housing having a partition forming two interior compartments. A supply of sand is stored in a first compartment and an electric air compressor is situated in a second compartment. A remote switch is operatively connected to a relay in the second compartment for energizing the compressor. An induction nozzle has a sand inlet extending through an aperture in the partition into the first compartment and is connected to an air supply tube connected to an output of the air compressor. An outlet tube in the second compartment has a first end connection to an outlet of the induction nozzle and a second end extending through a side wall of the housing. A pair of discharge tubes are connected by a quick release fitting to a second end of the outlet tube and a pair of discharge nozzles are provided on the discharge tubes for spraying a sand and air mixture adjacent drive wheels of the vehicle, to enhance traction on icy road surfaces. The device is conveniently removable from the vehicle trunk for replenishing the sand supply or for transferring between vehicles.

2 Claims, 4 Drawing Sheets

SAND DISPENSING DEVICE HAVING PLURAL COMPARTMENTS

BACKGROUND OF THE INVENTION

1. Field of the Invention

The present invention relates to sand dispensing devices, and more particularly pertains to a sand dispensing device for applying sand to icy road surfaces adjacent the drive wheels of a vehicle for providing enhanced traction. Many individuals, especially those living in rural areas of the country, must travel icy road surfaces during the winter months. These individuals must frequently await the passage of a sand truck over a particularly slippery road surface on a hill before they are able to pass this road section. In order to overcome this problem, the present invention provides a vehicle carrying sand dispensing device which sprays a sand and air mixture adjacent the drive wheels of the vehicle upon actuation of a remote switch.

2. Description of the Prior Art

Various types of sand dispensing devices are known in the prior art. A typical example of such a sand dispensing device is to be found in U.S. Pat. No. 2,606,781, which issued to T. Loftus on Aug. 12, 1952. This patent discloses a sand pipe dispensing nozzle for dispensing sand on a railroad track. U.S. Pat. No. 2,904,363, which issued to M. Michaletz on Sept. 15, 1959, discloses a sand dispenser for automobiles which utilizes a distributing hopper position ahead of a driving wheel of the vehicle, a supply hopper mounted on the vehicle, a heating chamber mounted on the vehicle between the supply and distributing hoppers and a conduit extending from the supply hopper to the distributing hopper and passing through the heating chamber. U.S. Pat. No. 2,999,711, which issued to L. Sturmer on Sept. 12, 1961, discloses a sand dispensing device adapted to be mounted in the trunk of a vehicle. The device includes an electric blower, and air jet assembly extending from and connected to an outlet of the blower and a gravity feed hopper for feeding sand into the blower outlet conduit. U.S. Pat. No. 3,345,097, which issued to H. Smith on Oct. 3, 1967, discloses a locomotive with a sanding system having a continuous airflow. The system includes an air chamber connected to a compressor for maintaining a predetermined pressure and a sand storage reservoir to supply sand through gravity feed into an air outlet passage connected to the chamber. U.S. Pat. No. 3,888,524, which issued to P. Lee on June 10, 1975, discloses a sand dispensing device which includes a sand storage and deposition tank disposed approximate to each wheel of a vehicle for depositing sand ahead of the corresponding wheel to reduce skidding of the vehicle. Each tank has an associated valve which is hydraulically operated via a fluid conduit coupled to a master cylinder of the vehicle so that upon application of the vehicle brakes, the sand is deposited.

While the above mentioned devices are suited for their intended usage, none of these devices disclose the provision of a a partitioned housing enclosing a sand supply and an air compressor which may be conveniently removed or installed from a vehicle trunk. Additionally, none of the aforesaid devices disclose a sand dispensing device which utilizes a sand induction nozzle having a sand inlet extending through an aperture in a partition wall to entrain sand in an air outlet conduit connected to an electric air compressor. Additional features of the present invention, not disclosed by the previously described prior art devices include the provision of an air compressor operatively connected to a relay which is selectively closed by a remote switch which is biased to an open position to prevent inadvertent prolonged operation of the device. Inasmuch as the art is relatively crowded with respect to these various types of sand dispensing devices, it can be appreciated that there is a continuing need for and interest in improvements to such sand dispensing devices, and in this respect, the present invention addresses this need and interest.

SUMMARY OF THE INVENTION

In view of the foregoing disadvantages inherent in the known types of sand dispensing devices now present in the prior art, the present invention provides an improved sand dispensing device. As such, the general purpose of the present invention, which will be described subsequently in greater detail, is to provide a new and improved sand dispensing device which has all the advantages of the prior art sand dispensing devices and none of the disadvantages.

To attain this, a representative embodiment of the concepts of the present invention is illustrated in the drawings and makes use of a housing having a partition forming two interior compartments. A supply of sand is stored in a first compartment and an electric air compressor is situated in a second compartment. A remote switch is operatively connected to a relay in the second compartment for energizing the compressor. An induction nozzle has a sand inlet extending through an aperture in the partition into the first compartment and is connected to air supply tube connected to an output of the air compressor. An outlet tube in the second compartment has a first end connected to an outlet of the induction nozzle and a second end extending through a side wall of the housing. A pair of discharge tubes are connected by a quick release fitting to a second end of the outlet tube and a pair of discharge nozzles are provided on the discharge tubes for spraying a sand and air mixture adjacent drive wheels of the vehicle, to enhance traction on icy road surfaces. The device is conveniently removable from the vehicle trunk for replenishing the sand supply or for transferring between vehicles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sand dispensing device which has all the advantages of the prior art sand dispensing devices and none of the disadvantages.

It is another object of the present invention to provide a new and improved sand dispensing device which may be easily and efficiently manufactured and marketed.

It is a further object of the present invention to provide a new and improved sand dispensing device which is of a durable and reliable construction.

An even further object of the present invention is to provide a new and improved sand dispensing device which is susceptible of a low cost of manufacture with regard to both materials and labor, and which accordingly is then susceptible of low prices of sale to the consuming public, thereby making such sand dispensing devices economically available to the buying public.

Still yet another object of the present invention is to provide a new and improved sand dispensing device which provides in the apparatuses and methods of the prior art some of the advantages thereof, while simultaneously overcoming some of the disadvantages normally associated therewith.

Still another object of the present invention is to provide a new and improved sand dispensing device for use to enhance traction of vehicles travelling on icy road surfaces.

Yet another object of the present invention is to provide a new and improved sand dispensing device which is conveniently removable from a vehicle trunk for replenishment of a sand supply or for transference between vehicles.

Even still another object of the present invention is to provide a new and improved sand dispensing device which utilizes an air compressor having an outlet connected to a sand induction nozzle and operatively connected for actuation by a relay which is closed by a remotely actuated switch which is biased to an open position to prevent inadvertent prolonged operation of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
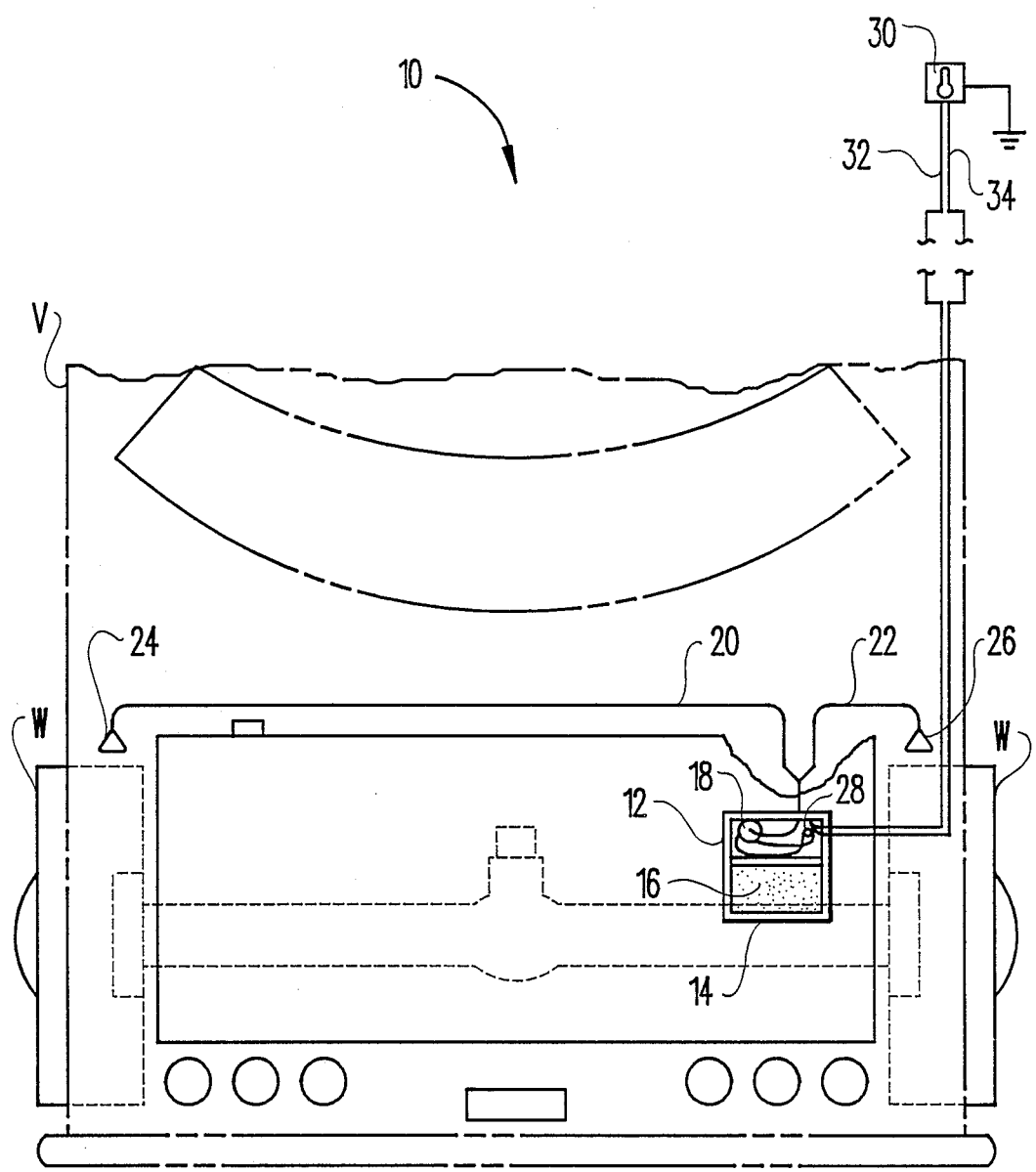
FIG. 1 is a diagrammatic top plan view illustrating the sand dispensing device of the present invention mounted in a vehicle.

With reference now to the drawings, and in particular to FIG. 1 thereof, a new and improved sand dispensing device embodying the principles and concepts of the present invention and generally designated by the reference numeral 10 will be described.

More specifically, it will be noted that the first embodiment 10 of the invention includes a generally rectangular housing having a first compartment 14 filled with a quantity of sand 16 and a second compartment 12 enclosing an electric air compressor 18 operatively connected to a relay 28. The relay 28 is connected by electrical wires 32 and 34 to a remote switch 30, adapted to be mounted adjacent the dash board of a vehicle. A pair of discharge tubes 20 and 22 are connected to an outlet tube extending through a side wall of the housing and are each provided with a discharge nozzle 24, 26 for spraying a sand and air mixture adjacent the drive wheels W of a vehicle V. The housing may be relatively compact and formed as a twelve inch square tube. A housing of this size allows storage of approximately 35 pounds of sand. The electric air compressor 18 is of the type which operates on 12 VDC and does not require a pressure storage tank, and preferably delivers a steady outlet pressure of 22 to 25 PSI. The remote switch 30 is preferably spring biased to an open position such that upon release of the switch 30, the relay 28 will be open, thus turning off the compressor 18. This prevents inadvertent prolonged operation of the device which would deplete the stored sand supply 16.

Figure 2:
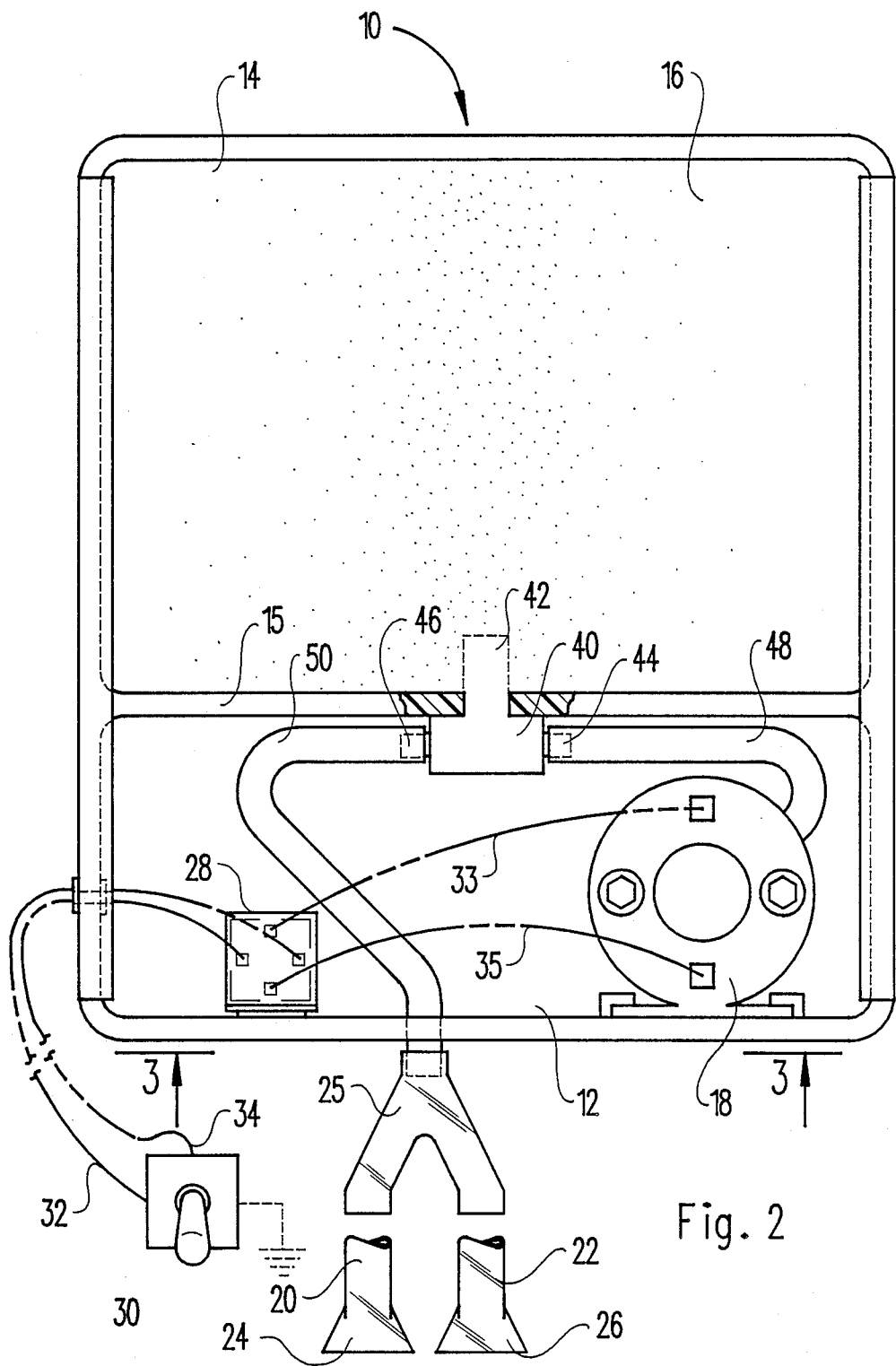
FIG. 2 is a top plan view of the sand dispensing device of the present invention.

As shown in FIG. 2, the housing has an interior partition wall 15 which separates the first 14 and second 12 interior chambers. The relay 28 is connected to the compressor 18 by electrical leads 33 and 35. An air supply tube 48 is connected to an output of the compressor 18, and to an inlet 44 of an induction nozzle 40. The induction nozzle 40 has a sand inlet 42 disposed horizontally through an aperture in the partition 15 into the sand supply 16 and the first compartment 14. An outlet tube 50 in the second compartment 12 has a first end connected to an outlet 46 of the induction nozzle 40 and a second end extending through a side wall of the housing. A pair of discharge tubes 20 and 22 are connected by a quick release fitting 25 to the outlet tube 50 to allow the housing to be conveniently removed from the vehicle trunk for transference between vehicles or for replenishment of the sand supply. As shown, the quick release fitting 25 may be formed by coaxial tubular portions received one within the other. Each of the discharge tubes 20 and 22 is provided with a discharge nozzle 24, 26 for spraying a sand and air mixture adjacent the drive wheels of a vehicle.

Figure 3:
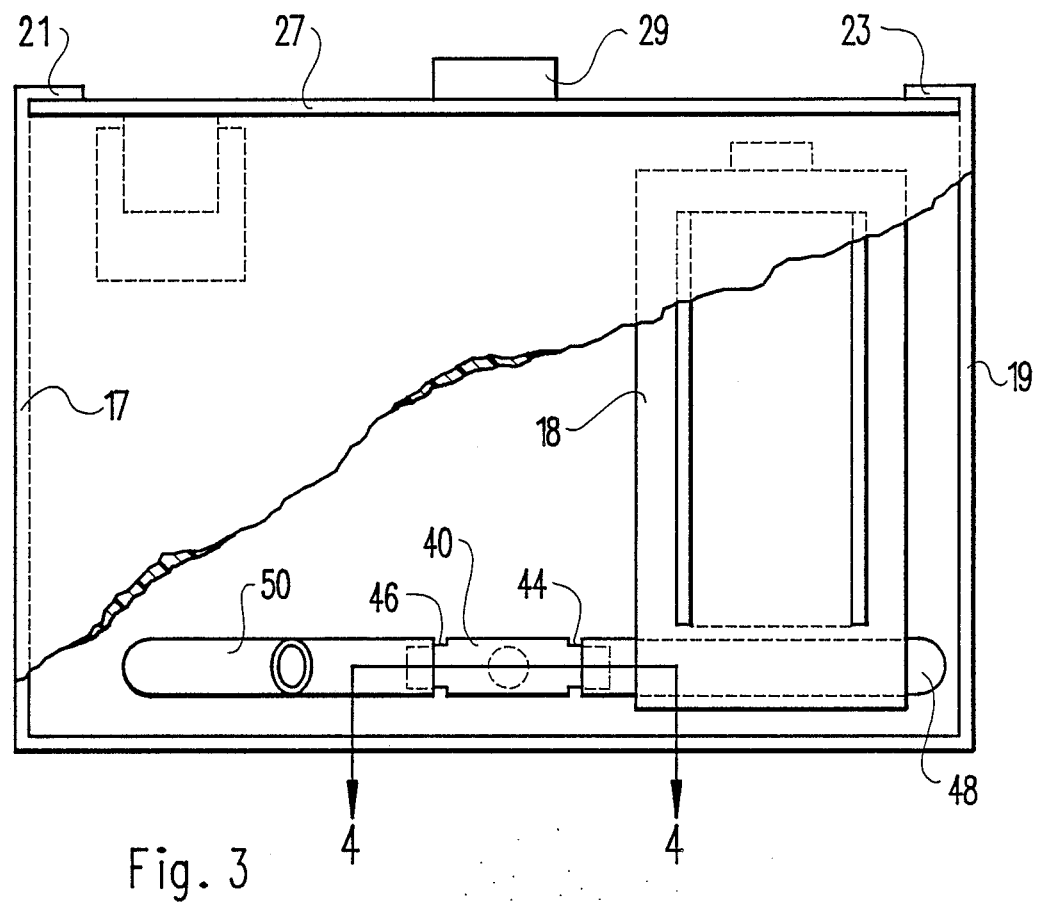
FIG. 3 is an end view taken along line 3-3 of FIG. 2, partially in cross section, further illustrating the sand dispensing device of the present invention.

As shown FIG. 3, the housing may have opposite side walls 17 and 19 provided with top rails 21 and 23 which form a guide channel for a removable slidable cover 27. A carrying handle 29 may be disposed on the top surface of the cover 27 for conveniently transporting the entire housing. Alternatively, the cover 27 may be formed as a hinged cover and provided with a suitable latch. The housing is preferably formed of a molded plastic material.

Figure 4:
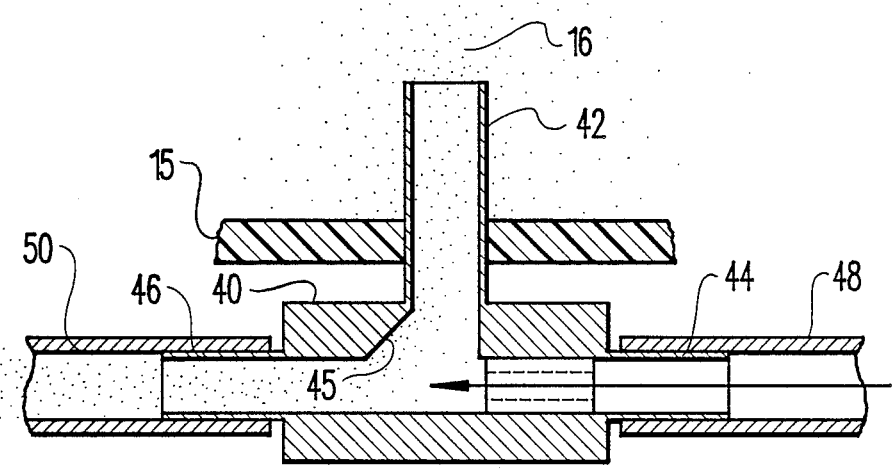
FIG. 4 is an enlarged detail cross sectional view, taken along line 4—4 of FIG. 3, illustrating the construction of the sand induction nozzle utilized in the sand dispensing device of the present invention.

As shown in the cross sectional view of FIG. 4, the sand induction nozzle 40 has a sand inlet 42 in fluid communication with an air inlet 44 connected to an air supply tube 48 connected to the air compressor. The compressed airflow travelling in the direction indicated by the arrow causes a low pressure or suction in the sand inlet tube 42 which causes the sand 16 to be entrained in the air stream by an aspiration or induction effect. The connecting wall 45 between the sand inlet 42 and the outlet 46 is preferably tapered to allow smooth entrainment of the supply of the sand 16. The sand and air mixture is then conducted through the output 46 to the outlet tube 50. The air supply tube 48 and the outlet tube 50 may be formed from a flexible rubber material which may be routed as required within a vehicle to direct the output sand adjacent the drive wheels of the vehicle. The flexible tubing does not have a significantly detrimental effect on the flow of the sand and air mixture therethrough.

In use, a driver of a vehicle may direct a quantity of sand to an icy road surface adjacent the drive wheels of a vehicle by selective actuation of the remote switch 30.

Figure 5:
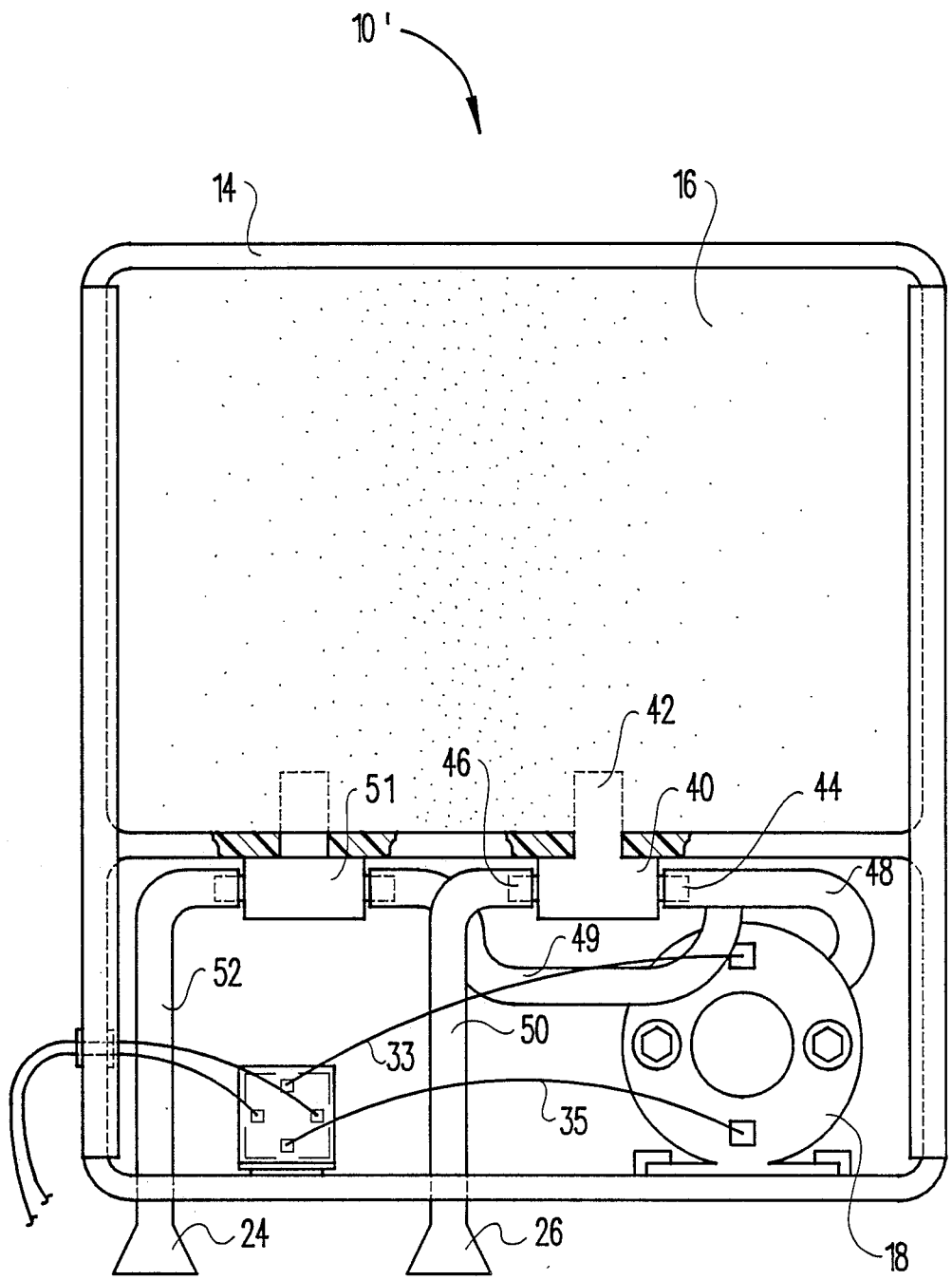
FIG. 5 illustrates an alternative sand induction arrangement.

FIG. 5 illustrates an alternative embodiment 10' in which separate induction nozzles 40 and 51 are provided. A takeoff line 49 communicates with the tube 48 and directs air to the induction nozzle 51 which exhausts a sand-air mixture through a conduit 52.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A sand dispensing device for use on vehicles, comprising:
    a housing;
    said housing having an open top portion provided with a selectively closable cover;
    a carrying handle on said housing;
    a partition forming two compartments in said housing;
    a supply of sand in a first of said compartments;
    an electric air compressor in a second of said compartments;
    a relay in said second compartment operatively connected for energizing said compressor;
    a remote switch operatively connected for selectively closing said relay;
    means biasing said switch to an open position;
    an air supply tube connected to an output of said air compressor;
    an induction nozzle in said second compartment connected to said air supply tube;
    said induction nozzle having a sand inlet extending horizontally through an aperture in said partition into said sand in said first compartment;
    said induction nozzle having an air inlet disposed coaxially with said outlet, said sand inlet extending perpendicular to said air inlet and outlet, a connecting wall within said induction nozzle tapering forwardly toward said outlet;
    an outlet tube in said second compartment having a first end connected to an outlet of said induction nozzle and a second end extending through a side wall of said housing;
    a pair of discharge tubes connected to said second end of said outlet tube by quick release connection means; and
    a pair of discharge nozzles on said discharge tubes for spraying a sand and air mixture adjacent drive wheels of a vehicle.

2. A sand dispensing device for use on vehicles, comprising:
    a housing;
    said housing having an open top portion provided with a selectively closable cover;
    a carrying handle on said housing;
    a partition forming two compartments in said housing;
    a supply of sand in a first of said compartments;
    an electric air compressor in a second of said compartments;
    a relay in said second compartment operatively connected for energizing said compressor;
    a remote switch operatively connected for selectively closing said relay;
    means biasing said switch to an open position;
    an air supply tube connected to an output of said air compressor;
    a pair of induction nozzles in said second compartment connected to said air supply tube;
    said induction nozzles each having a sand inlet extending horizontally through an aperture in said partition into said sand in said first compartment;
    a pair of outlet tubes in said second compartment each having a first end connected to an outlet of one of said induction nozzles and a second end extending through a side wall of said housing;
    each of said induction nozzles having an air inlet disposed coaxially with said outlet, said sand inlet extending perpendicular to said air inlet and outlet, a connecting wall within said induction nozzle tapering forwardly toward said outlet;
    a pair of discharge tubes connected to said second ends of said outlet tubes by quick release connection means; and
    a pair of discharge nozzles on said discharge tubes for spraying a sand and air mixture adjacent drive wheels of a vehicle.

* * * * *